(12) United States Patent
Campagnolo

(10) Patent No.: US 7,017,440 B2
(45) Date of Patent: *Mar. 28, 2006

(54) ELECTRICAL CONTROL DEVICE FOR MOTOR DRIVEN DERAILLEUR FOR BICYCLE

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/632,777

(22) Filed: Aug. 1, 2003

(65) Prior Publication Data

US 2004/0089092 A1    May 13, 2004

Related U.S. Application Data

(63) Continuation of application No. 09/873,377, filed on Jun. 5, 2001, now Pat. No. 6,619,154.

(51) Int. Cl.
*B62K 25/00*    (2006.01)

(52) U.S. Cl. .................. 74/502.2; 74/473.13

(58) Field of Classification Search ............ 74/473.14, 74/473.13, 502.2, 489, 501.6; 474/17, 78, 474/81, 82, 79, 80

See application file for complete search history.

(56) References Cited

U.S. PATENT DOCUMENTS

| | | | |
|---|---|---|---|
| 4,071,892 A | 1/1978 | Genzling |
| 4,143,557 A | 3/1979 | Wakebe et al. |
| 4,490,127 A | 12/1984 | Matsumoto et al. |
| 4,605,240 A | 8/1986 | Clem et al. |
| 4,946,425 A | 8/1990 | Buhlmann |
| 5,213,548 A | 5/1993 | Colbert et al. |
| 5,358,451 A | 10/1994 | Lacombe et al. |
| 5,470,277 A | 11/1995 | Romano |
| 5,479,776 A | 1/1996 | Romano |
| 5,480,356 A | 1/1996 | Campagnolo |
| 5,494,307 A | 2/1996 | Anderson |
| 5,514,041 A | 5/1996 | Hsu |
| 5,519,378 A | 5/1996 | Queensbury |
| 5,625,336 A | 4/1997 | Yamamoto |
| 5,653,649 A | 8/1997 | Watarai |
| 5,670,988 A | 9/1997 | Tickle |

(Continued)

FOREIGN PATENT DOCUMENTS

DE    3136922    3/1983

*Primary Examiner*—Chong H. Kim
(74) *Attorney, Agent, or Firm*—Volpe and Koenig, P.C.

(57) ABSTRACT

An electrical control device for a motor-driven derailleur for bicycles. The control device has a supporting body adapted for attachment to the handlebars of the bicycle. A brake lever is mounted on the supporting body so that it can oscillate. A pair of switches, for controlling gear change, are carried by the supporting body. The switches are preferably mounted on a supporting plate that is located on the supporting body. Preferably, the switches are pre-assembled on the support plate before the plate is positioned on the supporting body.

17 Claims, 4 Drawing Sheets

U.S. PATENT DOCUMENTS

| | | |
|---|---|---|
| 5,676,021 A | 10/1997 | Campagnolo |
| 5,728,017 A | 3/1998 | Bellio et al. |
| 5,806,372 A | 9/1998 | Campagnolo |
| 5,865,454 A | 2/1999 | Campagnolo |
| 5,900,705 A | 5/1999 | Kimura |
| 6,012,665 A * | 1/2000 | Olona .................. 242/250 |
| 6,015,036 A | 1/2000 | Fukuda |
| 6,031,190 A | 2/2000 | Tokuda et al. |
| 6,069,788 A | 5/2000 | Masui |
| 6,073,730 A | 6/2000 | Abe |
| 6,129,580 A | 10/2000 | Kishimoto |
| 6,142,281 A | 11/2000 | Campagnolo |
| 6,146,297 A | 11/2000 | Kimura |
| 6,216,078 B1 * | 4/2001 | Jinbo et al. .................. 701/70 |
| 6,521,851 B1 | 2/2003 | Handa et al. |

\* cited by examiner

ELECTRICAL CONTROL DEVICE FOR MOTOR DRIVEN DERAILLEUR FOR BICYCLE

CROSS REFERENCE TO RELATED APPLICATIONS

This application is a continuation of and claims priority to U.S. patent application Ser. No. 09/873,377, filed Jun. 5, 2001, now U.S. Pat. No. 6,619,154, which is hereby incorporated by reference herein as if fully set forth in its entirety. This application also claims benefit of and priority to Italian Patent Application TO2000A000540, filed Jun. 6, 2000.

The present invention relates to an electrical control device for a motor-driven derailleur for bicycles.

More precisely, the invention relates to a control device of the type comprising:

- a supporting body provided with means for fixing it to the handlebars of a bicycle;
- a brake lever mounted on the supporting body in such a way that it can oscillate about a first axis;
- a pair of electrical switches for controlling gear change, which are carried by the supporting body; and
- a gear lever which can be operated manually for controlling one of said switches.

A control device of the type specified above is known from the U.S. Pat. No. 5,470,277 in the name of the present applicant, which describes an electrical control device provided with two switches set in a supporting body fixed to the handlebars of a bicycle. One first switch is operated by a gear lever set immediately behind the brake lever, and a second switch is operated by means of a push-button located on a side wall of the supporting body. The two electrical switches make it possible to actuate an electric motor associated to a derailleur for bicycles in two opposite directions. Actuation of the motor of the derailleur in one first direction makes it possible to obtain shifting of the chain in one first direction, for example towards the higher gear ratios, whilst actuation of the motor in the opposite direction corresponds to shifting of the chain in the opposite direction, for example towards the lower gear ratios.

The document U.S. Pat. No. 6,015,036 describes an electrical control device for a bicycle including a switch for controlling gear change, which is supported by the brake lever. A second switch for controlling gear change may be set in the vicinity of the brake lever. This solution is not as advantageous as the one in which both of the switches are set on the supporting body in so far as it entails the need to bring an electrical connection onto the brake lever, which oscillates with respect to the supporting body.

The purpose of the present invention is to provide a an electrical control device of an improved type which is simple from the constructional standpoint and has greater functionality than known devices.

According to the present invention the above purpose is achieved by a control device having the characteristics specified in claim 1.

The present invention will now be described in detail with reference to the attached drawings, which are furnished purely by way of non-limiting example, and in which.

Figure 1:
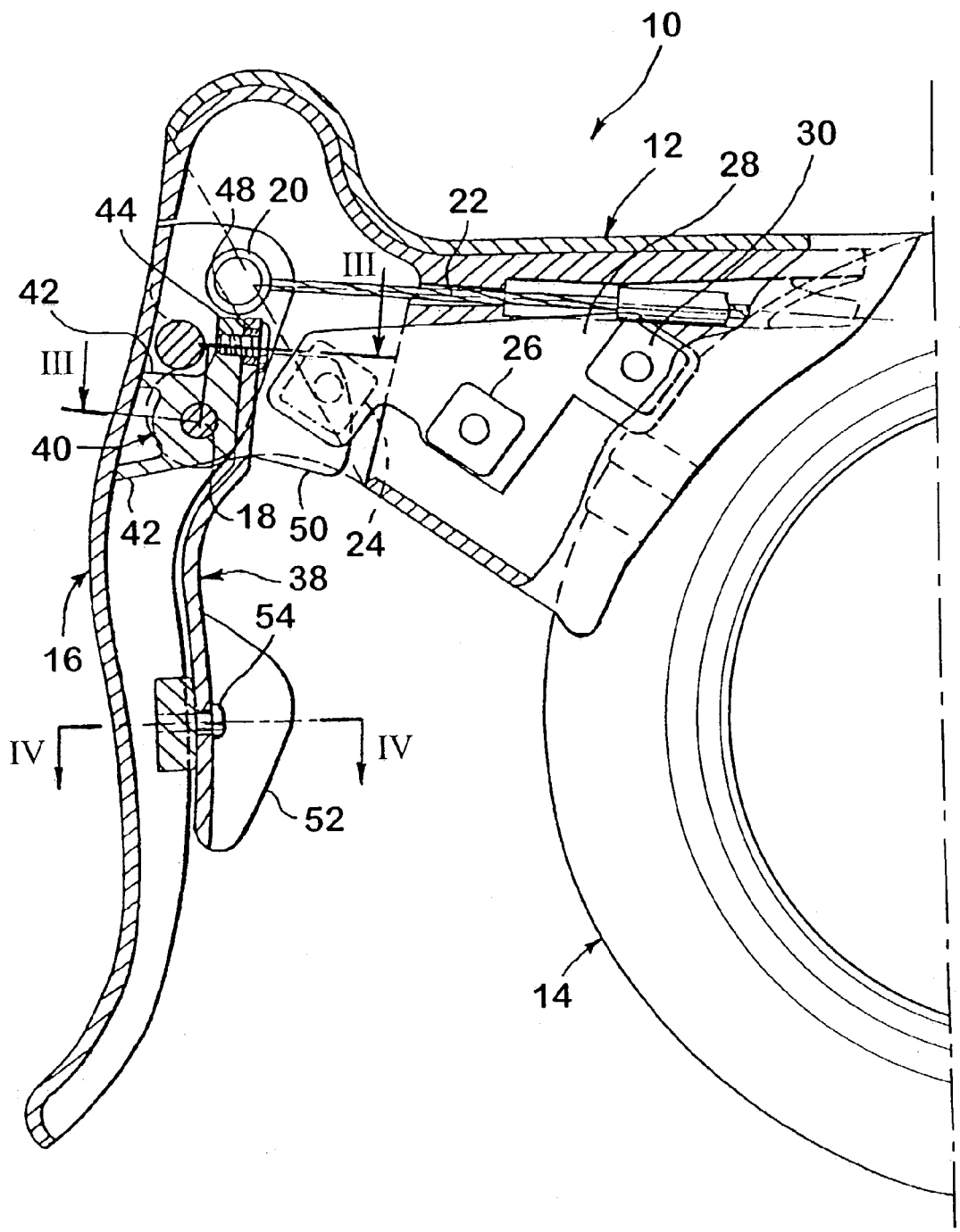
FIGS. 1 and 2 are side sectional views of a control device according to the present invention in two operating positions.

With reference to the drawings, the number 10 designates an electrical control device for a motor-driven derailleur for bicycles. The control device according to the present invention can be used for controlling a motor-driven gear change, for example of the type described in the U.S. Pat. No. 5,470,277 in the name of the present applicant.

The control device 10 comprises a supporting body 12 provided with means of a conventional type for its fixing to a bicycle handlebars 14. The control device 10 comprises a brake lever 16 which is articulated to the supporting body 12 by means of a pivot 18. One end 20 of a brake cable 22 is anchored in a conventional way to a top portion of the brake lever 16. As may be seen in FIGS. 1 and 2, the brake lever 16 may be made to oscillate manually about the pivot 18 for controlling the bicycle brake, in an altogether conventional way.

The supporting body 12 carries a pair of electrical switches, designated by 24 and 26, for controlling gear change. Preferably the said switches are set on opposite faces of a supporting plate 28 fixed to the supporting body 12. In the example of embodiment illustrated in the figures, the supporting plate 28 also carries a third switch 30 designed to control a cycle-computer (not illustrated). The first switch 24 is designed to operate an electrical motor for controlling a gear change (not illustrated) in one first direction corresponding, for example, to shifting of the chain towards higher gear ratios. Operation of the second switch 26 causes actuation of the motor in the opposite direction, corresponding, for example, to shifting of the chain towards lower gear ratios. The control device 10 can be used indifferently for controlling the front derailleur or the rear derailleur of a bicycle. Consequently, in the control device set on the right-hand side of the bicycle handlebars (usually designed to control the rear derailleur), the switch 24 controls gear change towards lower gear ratios (i.e., shifting of the chain onto gear wheels with a greater number of teeth), whilst the switch 26 controls gear change towards higher gear ratios (i.e., shifting of the chain onto gear wheels with a smaller number of teeth). Instead, in the control device set on the left-hand side of the handlebars (usually designed to control the front derailleur), the situation is reversed; i.e., the switch 24 controls gear change towards higher gear ratios (i.e., towards a gear wheel driven by the bottom bracket with a greater number of teeth), whilst the switch 26 controls gear change towards lower gear ratios (i.e., towards a gear wheel driven by the bottom bracket with a smaller number of teeth).

Figure 3:
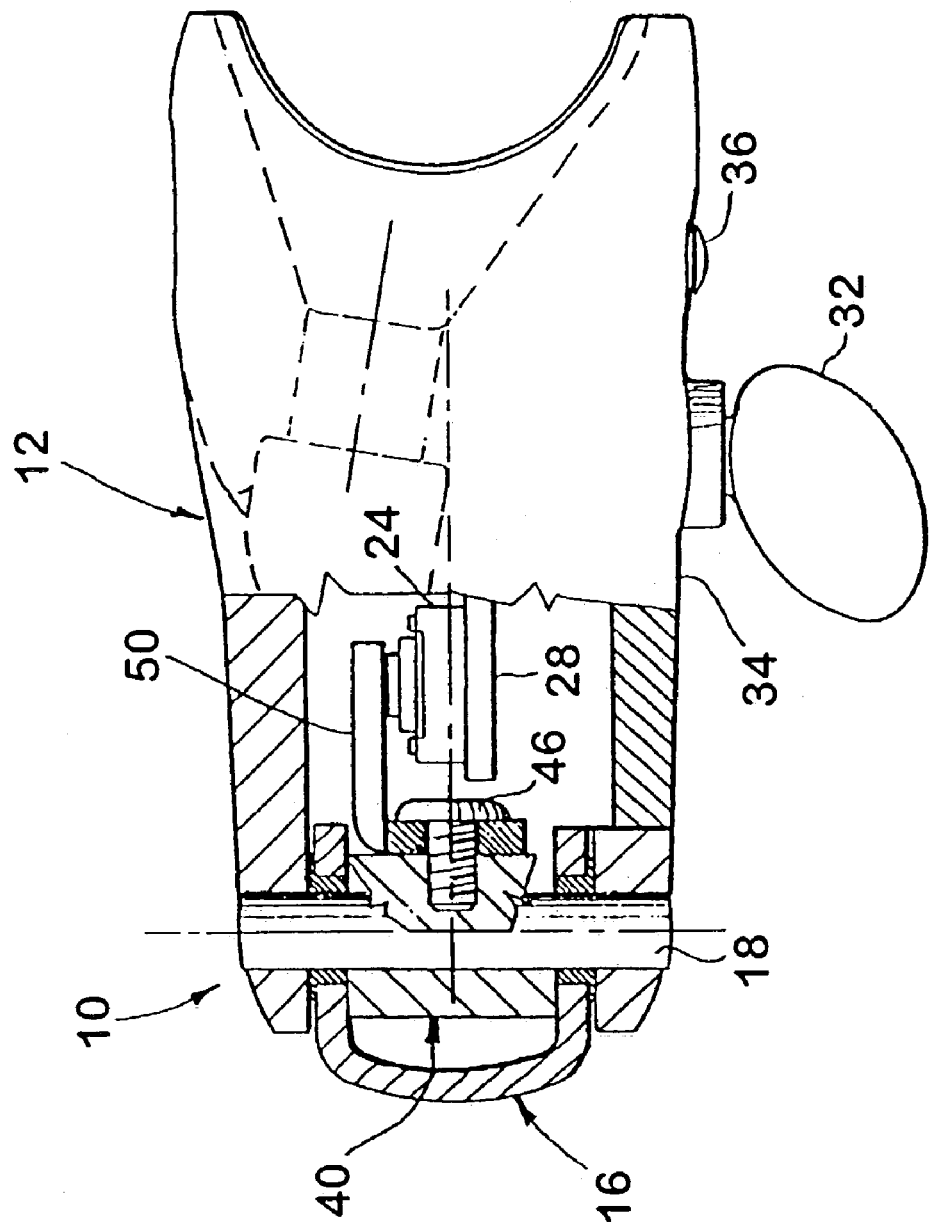
FIG. 3 is a cross section according to the line III—III of FIG. 1.

With reference to FIG. 3, the switch 26 is preferably controlled by means of a push-button 32 set on one side of the supporting body 12, in a position such that it can be operated by the cyclist's thumb while the cyclist's hand engages the supporting body 12 or the curved part of the handlebars 14. Preferably, the push-button 32 has a control surface which is substantially orthogonal to a side wall 34 of the supporting body 12 and is articulated to said side wall 34 about an axis that is substantially orthogonal to the pivot 18.

Preferably, the switch 30 designed for operative control of the cycle-computer can be actuated by means of a push-button that slightly projects from the side wall 34 of the supporting body 12 and is provided with a short operating travel in a direction substantially orthogonal to the side wall 34.

Figure 2:
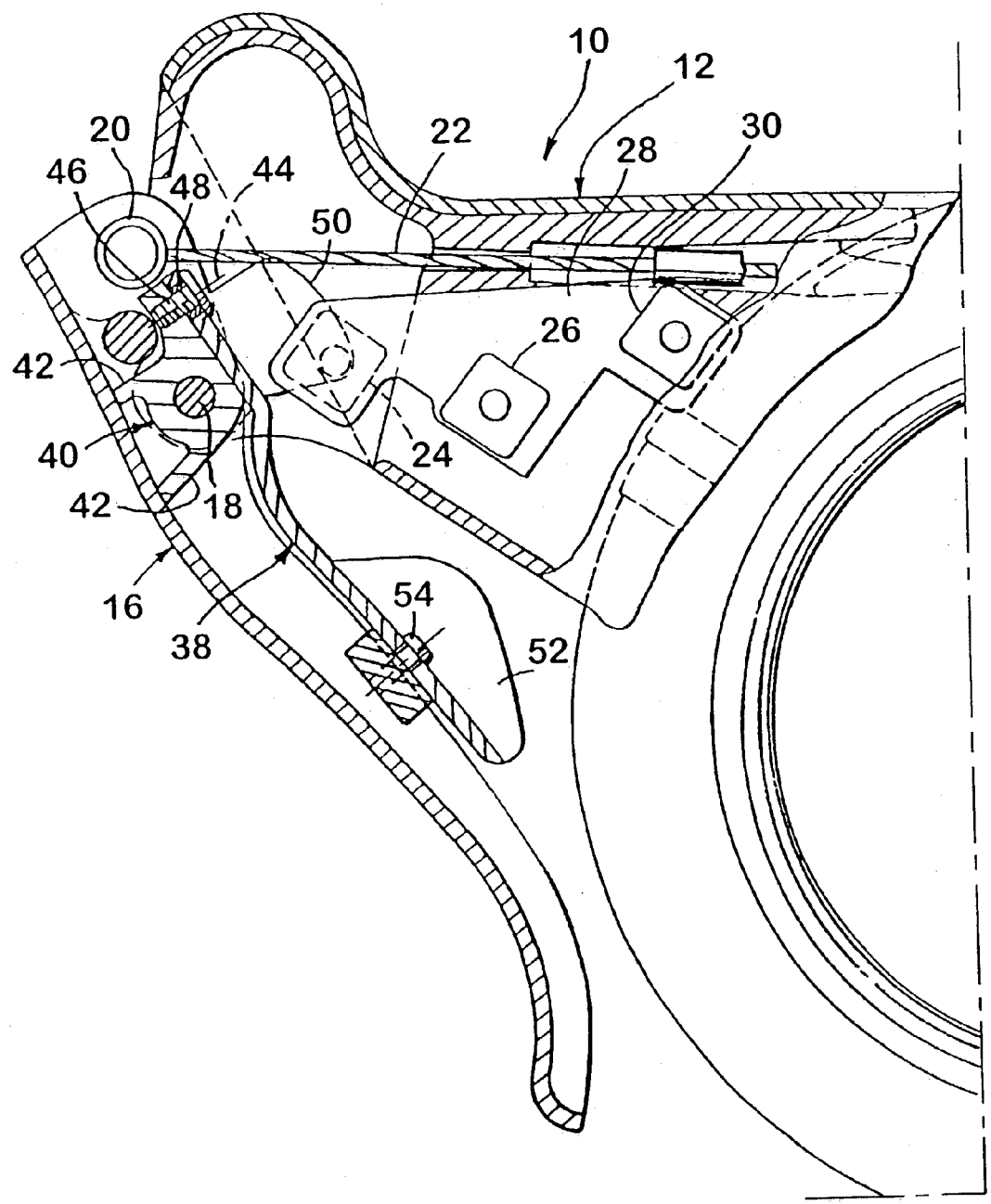

The control device according to the present invention comprises a gear lever 38 set immediately behind the brake lever 16. The control lever 38 is carried, so that it can oscillate, by an intermediate support 40, which in turn is mounted on the supporting body 12 in such a way that it oscillates about the axis of the pivot 18 of the brake lever 16. As may be seen in FIG. 3, the brake lever 16 has a substantially U-shaped cross section, and the intermediate support 40 is preferably housed inside the brake lever. The intermediate support 40 is free to rotate about the pivot 18. As illustrated in FIGS. 1 and 2, the intermediate support 40 rests against the internal surface of the brake lever 16 by means of a pair of projecting portions 42. Consequently, when the brake lever 16 is made to oscillate from the resting position, illustrated in FIG. 1, to a braking position, illustrated in FIG. 2, the intermediate support 40 oscillates together with the brake lever 16 about the pivot 18. The control lever 38 is articulated to the intermediate support 40 about an axis 44 which is substantially orthogonal to the axis of the pivot 18 of the brake lever. In the example illustrated in the figures, the articulated connection between the gear lever 38 and the intermediate support 40 is obtained by means of a screw 46 fixed to the intermediate support 40 and carrying a bushing 48 about which the lever 38 turns. The said lever 38 is therefore free to oscillate about the axis 44, and moreover oscillates about the axis of the pivot 18 together with the brake lever 16 during the braking movement, as illustrated in FIG. 2.

The gear lever 38 is provided with two flaps or tabs 50, 52 (which in the example illustrated are integral with the lever) constituting, respectively, a portion for actuating the switch 24 and a control portion on which it is possible to act manually for causing the lever 38 to oscillate about the axis 44 in the direction corresponding to the actuation of the switch 24.

Figure 4:
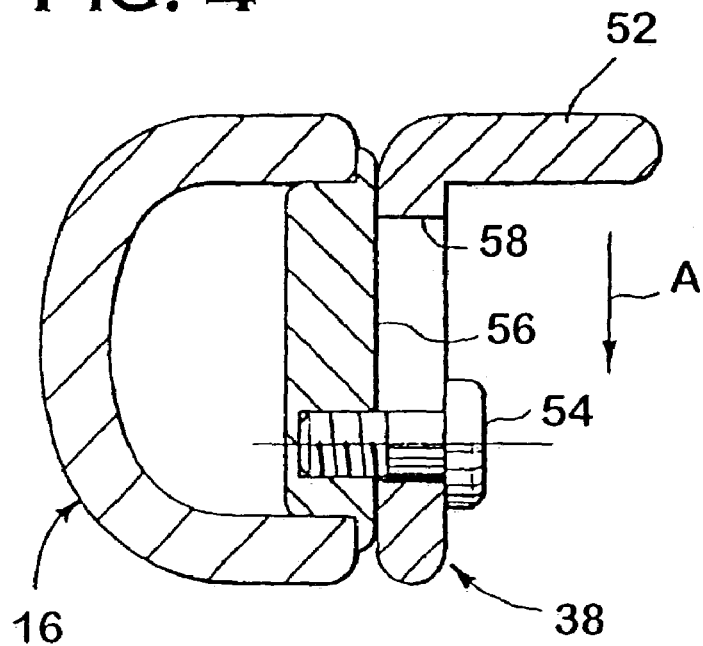
FIGS. 4 and 5 are cross sections according to the line IV—IV of FIG. 1 in two operating positions.
Figure 5:
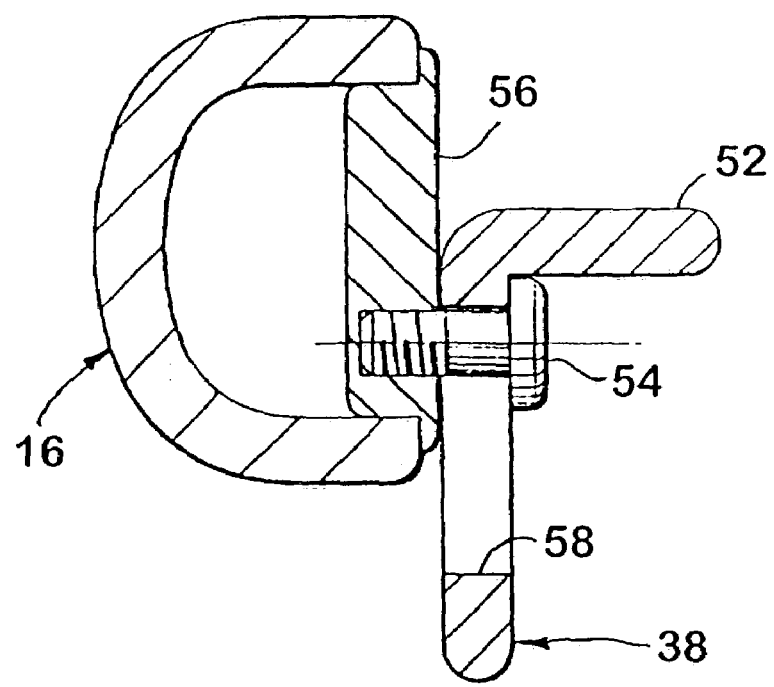

Preferably, the gear lever 38 is associated to an arrest device which limits the range of oscillation of the lever 38, in order to prevent damage to the switch 24. As is illustrated in greater detail in FIGS. 4 and 5, the said arrest device comprises a pin 54 fixed to a plate 56, which in turn is fixed to the brake lever 16, on the surface of the latter that faces the handlebars 14. The pin 54 engages with play a groove 58 made in the gear lever 38. FIG. 4 illustrates the gear lever in the resting position, in which the tab 50 constituting the portion for actuating the switch 24 is set facing, and at a slight distance from, the switch 24. To issue a command for gear change, the user acts manually on the tab 52, causing the control lever 38 to oscillate in the direction indicated by the arrow A in FIG. 4. FIG. 5 illustrates the position of maximum oscillation of the lever 38, defined by the impinging of the pin 54 upon the end of the groove 58. In this position, the tab 50 actuates the switch 24, which controls gear change. As illustrated in FIG. 2, the tab 50 of the gear lever 38 which operates the switch 24 can have an extension whereby it is facing the switch 24 even when the brake lever 16 is in the braking position. In this way, the cyclist has the possibility of changing gears even while he is applying the brakes. Gear change in the opposite direction is by exerting pressure on the push-button 32 in a direction orthogonal to the plane of representation of FIG. 3, so as to cause said push-button to oscillate in a direction to which there corresponds operation of the switch 26.

In particular, according to a further aspect of the invention, the lever 38 could be eliminated, and the switch 24 could have its push-button set in such a way that it can be operated directly. In this case, the invention would present even so its innovative characteristic consisting in the fact that the electrical switches are all carried by the supporting plate 28, so that they can be pre-assembled on the plate and then be simultaneously arranged in their final positions by simply mounting the plate on the body 12 for supporting the brake lever.

I claim:

1. A control system for a bicycle having a handlebar, comprising:
   a mount adapted for positioning on the handlebar and for supporting a brake lever;
   first and second electrical switches located in the mount;
   a gear change mechanism in communication with the first and second electrical switches and being operatively associated with at least one of a front derailleur and a rear derailleur, wherein the gear change mechanism increases a gear ratio of the bicycle when one of the first and second electrical switches is activated and decreases the gear ratio when another one of the first and second electrical switches is activated;
   a first button disposed on the mount for activating the first electrical switch; and
   a second button disposed on the mount for activating the second electrical switch;
   wherein the first and second electrical switches are located on a plate disposed in the mount;
   wherein the first and second electrical switches are located on opposite sides of the plate, the plate being oriented such that the opposite sides are generally perpendicular to a portion of the mount that is configured to engage the handlebar.

2. The control system of claim 1, further comprising a third electrical switch disposed on the plate and being in communication with a cycle computer.

3. The control system of claim 1, wherein the control system comprises two of the mounts being attached to the handlebar so that the front derailleur and the rear derailleur are each controlled by a separate mount.

4. A motor driven derailleur control device mountable on a bicycle handlebar, the control device comprising:
   a support body having a portion thereof configured for mounting on the bicycle handlebar, an interior cavity, and exterior walls;
   a brake lever mounted to the support body for movement toward and away from the support body;
   a support plate located within the interior cavity of the support body;
   at least first and second electrical switches mounted on the support plate, each switch being operatively connected to a motor driven derailleur;
   a gear change selector mounted behind and in selective contact with the brake lever and in communication with a selected one of the first and second electrical switches, wherein the gear change selector engages the selected one of the first and second electrical switches to activate a first gear ratio change; and
   a gear change switch located on the exterior walls of the support body and in communication with another one of the first and second electrical switches, wherein the gear change switch engages the another one of the first and second electrical switches to activate a second gear ratio change;
   wherein the first and second electrical switches are located on apposite sides of the support plate.

5. The control device of claim 4, wherein the brake lever defines a path of motion when moving toward and away from the support body, the gear change selector rotates in a direction generally orthogonal to the path of motion to bring the gear change selector into contact with the selected one of the first and second electrical switches.

6. The control device of claim 4, wherein the support plate is oriented so that the opposite sides thereof are generally parallel to opposing interior cavity walls in the support body.

7. The control device of claim 6, further comprising a third electrical switch disposed in the support body and in communication with a cycle computer.

8. The control device of claim 7, wherein the third electrical switch is disposed on the support plate.

9. The control device of claim 4, wherein the gear change switch is attached to the support body for movement about an axis that is generally orthogonal to a path of motion defined by movement of the brake lever toward and away from the support body.

10. The control device of claim 4, wherein the support plate is oriented so that the opposite sides thereof are generally perpendicular to the portion of the support body that is configured for mounting on the bicycle handlebar.

11. The control device of claim 4, wherein the brake lever is rotatably attached to the support body about a pivot axis, the gear change selector being pivotally mounted to the brake lever about an axis generally perpendicular to the pivot axis.

12. A method of providing a motor driven derailleur control for a bicycle, the method comprising the following steps:
   providing a support body having an interior cavity and a portion configured for mounting on a handlebar of the bicycle;
   installing at least first and second switches on a support plate;
   positioning the support plate in the interior cavity;
   pivotally interconnecting a gear change selector with the motor driven derailleur control and establishing communication between the gear change selector and one of the first and second switches, wherein when the gear change selector activates the one of the first and second switches a first gear ratio change occurs; and
   attaching a gear change switch to the motor driven derailleur control and establishing communication between the gear change switch and the other one of the first and second switches, wherein when the gear change switch activates the other one of the first and second switches a second sear ratio change occurs;
   wherein the step of installing the first and second switches comprises positioning the first and second switches on opposite sides of the support plate.

13. The method of claim 12, wherein the step of positioning the support plate comprises orienting the support plate so that opposite sides thereof are generally parallel to opposing interior cavity walls in the support body.

14. The method of claim 12, further comprising the step of installing a third switch in the support body and establishing communication between the third switch and a cycle computer.

15. The method of claim 14, wherein the step of installing the third switch comprises installing the third switch on the support plate.

16. The method of claim 12, further comprising attaching a brake lever to the support body so that the motor driven derailleur control can change a gear change ratio of the bicycle while braking.

17. The method of claim 12, wherein the step of positioning the support plate comprises orienting the support plate so that apposite sides thereof are generally perpendicular to the portion configured for mounting on the handlebar.

* * * * *

UNITED STATES PATENT AND TRADEMARK OFFICE
CERTIFICATE OF CORRECTION

| | | |
|---|---|---|
| PATENT NO. | : 7,017,440 B2 | Page 1 of 1 |
| APPLICATION NO. | : 10/632777 | |
| DATED | : March 28, 2006 | |
| INVENTOR(S) | : Valentino Campagnolo | |

It is certified that error appears in the above-identified patent and that said Letters Patent is hereby corrected as shown below:

At column 1, line 51, replace the words "provide a an" with -- "provide an" --.
At column 3, line 37, replace the words "play a groove" with -- "play groove"--.

Signed and Sealed this

Ninth Day of January, 2007

JON W. DUDAS
*Director of the United States Patent and Trademark Office*